June 22, 1965

D. I. POMERANTZ 3,190,954

SEMICONDUCTOR DEVICE

Filed Feb. 6, 1962

INVENTOR.
DANIEL I. POMERANTZ
BY
Kenway, Jenney & Hildreth
ATTORNEYS 3,190,954
SEMICONDUCTOR DEVICE
Daniel I. Pomerantz, Lexington, Mass., assignor to Clevite Corporation, a corporation of Ohio
Filed Feb. 6, 1962, Ser. No. 171,451
3 Claims. (Cl. 174—94)

Figure 1:
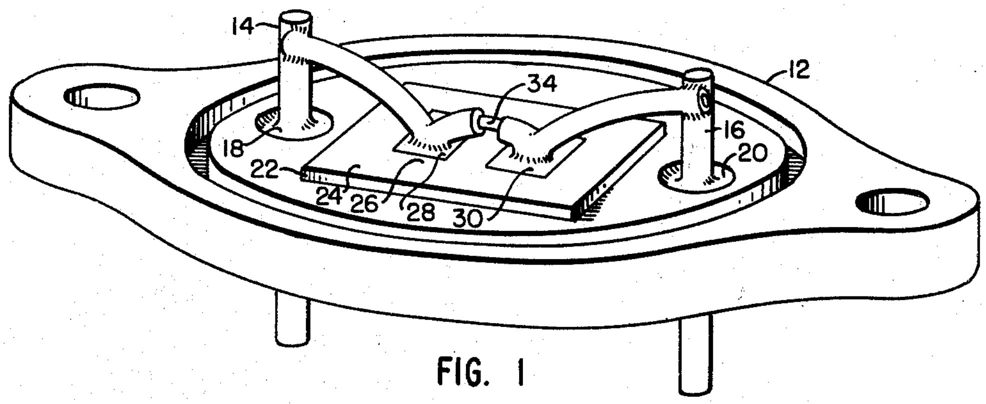

This invention relates in general to the manufacture of transistors and in particular to a provision of contacts in mesa or planar transistors.

Generally, in electronic devices such as transistors, the problem of making contact to the operative elements is relatively simple. Various techniques such as soldering, gold-bonding, and in some instances, spot-welding are quite adequate. However, in the case of structures of extremely small size and fragility, such as are commonly encountered in mesa or planar transistors, older and well-known techniques are simply too crude to be used. Frequently, the wire utilized for making contact may be as small as 0.0005 inch in diameter. Connecting wires of such tiny diameter to the elements of the device is conventionally accomplished by thermocompression bonding. The material most commonly used for the wire is gold, principally because its malleability renders it eminently suitable to be expanded in the manner necessary for successful thermocompression bonding.

In the making of a thermocompression bond, the elements of the semiconductor device are frequently "striped" by the evaporation of a metal such as aluminum upon them. The gold wire is pressed upon the stripe, and heat is applied to raise the temperature to a point well below the melting point of either of the metals being joined. In fact, the temperature is maintained below the melting point of any alloy of the gold and aluminum, for example, the eutectic.

The applied pressure is sufficient to expand the metals sufficiently that surface oxides are broken up and relatively large areas of newly exposed unoxidized surfaces are brought into intimate contact to form a permanent bond. Obviously, handling of wire of such tiny diameter and metal stripes of insignificant dimensions is a difficult matter. A certain amount of breakage, particularly of the wire, is invariably encountered. Moreover, even if the bond is successfully made between the surface to be contacted and the wire, the transistors which are ultimately made are often subjected to severe stresses that are built up by forces of acceleration in some applications. Breakage of wire at this point is, of course, most serious because of the resulting failure of the transistor and its associated circuitry.

Unfortunately, the high degree of malleability required to effect proper thermocompression bonding is almost uniquely present in gold, although other metals, notably silver, are also practical to a somewhat lesser degree. Thus, the thinking in the industry has been concentrated on the use of gold wire even though it is recognized that such continued use is fraught with difficulty.

It is, therefore, a primary object of the present invention to overcome the problem presented by the mutually incompatible requirements of strength and malleability in metals used in thermocompression bonding.

It is a further object of the present invention to improve the materials and mechanics of thermocompression bonding.

It is another object of the present invention to improve transistors, particularly in their resistance to stresses such as those caused by heavy acceleration forces.

It is still another object of the present invention to reduce the cost and care involved in the handling of fine wire for transistor contact purposes.

It is a still further object of the present invention to simplify and reduce the cost of making electrical connections to transistor elements.

Figure 2:
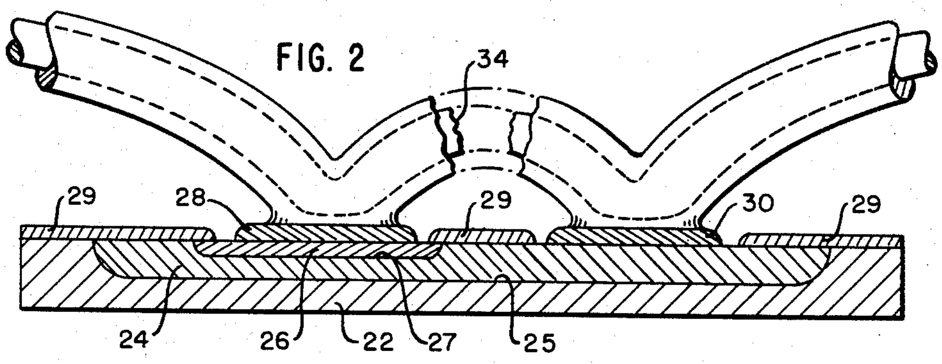

In general, the present invention consists in a material which combines both strength and malleability, malleability being exhibited by the portion of the material most intimately related to the thermocompression bonding and the strength being exhibited by material only incidentally involved in the bonding process. The material is preferably one in which a strong hard core is coated, plated, or clad with an adherent malleable outer metal. In a preferred embodiment of the invention, a wire having a core of molybdenum and a coating of gold is bonded to the transistor contacts. For convenience in fabricating the transistor, the coating is preferably absent in a region between two of the elements being contacted to permit the making of separate contacts. This latter expedient simplifies the removal of the unwanted bridging portion of molybdenum by, for example, hydrogen peroxide or other solvent which has no deleterious effects on other elements or materials of the transistor. The gold may be previously removed from the bridging portion of the wire by any one of several processes, such as a photoresist technique where the etchant might be, for example, aqua regia. Rinsing may be utilized to control the depth of etching if the etchant is of a type which also effects the core material. For a better understanding of the present invention, together with other and further objects, features and advantages, reference should be made to the following detailed description of a preferred embodiment which should be read in conjunction with the appended drawing, in which:

FIG. 1 is a perspective view of a mesa transistor with the cap removed and showing structural details of the present invention, and FIG. 2 is a schematic sectional view of a device made in accordance with the present invention.

In FIG. 1, there may be seen a header 12, which may be composed of any one of numerous available metals; however, for convenience in manufacture and to permit the making of hermetic glass-to-metal seals, Kovar is preferred. Passing through the header are two pins 14 and 16, which are sealed in glass beads 18 and 20, respectively. The beads, in turn, are sealed to the Kovar header 12.

Mounted on the header, preferably by means of gold-alloying, is an element 22 of semiconductive material such as silicon. The semiconductor element per se serves as the collector, and it is, of course, electrically connected to the header 12. Upon the semiconductor element, a base region 24 is formed by the diffusion of boron into the semiconductor element. Upon one side of the base region 24, an emitter region 26 is formed by the diffusion therein of phosphorous. The various diffusion steps are carried out by conventional means, and the areas of diffusion may be determined by equally conventional means, as, for example, by oxide masking.

Two aluminum stripes are formed by the evaporation of that metal upon desired areas or by other suitable processes. The first aluminum stripe 28 is evaporated upon the emitter region 26, and the second aluminum stripe 30 is evaporated upon the base region 24. It is to these stripes that connection must be made to fabricate a transistor, the third connection to the collector being available as noted above by way of the header to which the collector is bonded. In order to make the necessary connections, a single length of molybdenum wire of a diameter of about .0007 inch coated with gold of a thickness of about .0002 inch is gold-bonded first to the pin 14 by conventional techniques. The wire is then laid first upon the aluminum strip 28, a thermocompression tool is brought down upon the wire, and heat and pressure are applied to bond it to the stripe 28. Approximately midway in the length of the wire is a short section 34, which has no gold coating. At a point just beyond this uncoated section, a second thermocompression is made by bringing a similar tool down upon the wire with heat and pressure to make a bond between the gold of the wire and the aluminum base stripe. The other end of the wire is then gold-bonded to the pin 16. After the bonding operation is completed, the entire unit may be immersed in hydrogen peroxide to dissolve the exposed molybdenum section 34 and separate contacts are thus established between the pin 14 and the stripe 28 and between the pin 16 and the stripe 30.

As was previously noted, the wire utilized need not be composed of molybdenum, but various other hard materials having considerable tensile strength such as tungsten, nickel, or the like are suitable. Similarly, the coating need not be of gold, but may be of any one of several highly malleable materials such as silver. The coating of the core wire may be accomplished by any technique that provides sufficient adherence. By way of example, the core wire may be clad or plated with the coating substance.

FIG. 2 is a somewhat idealized schematic showing of various areas and junctions in the semiconductor device and the masking oxides utilized in the fabrication process. The basic semiconductor element 22 which, as has been noted, is composed of silicon or other semiconducting substance, first has a base region 24 diffused into its upper surface, this region being formed by the diffusion of boron into the semiconductor element. A junction more or less defined by the line 25 between the collector region and the base region is thus formed. Upon the base region, an emitter region 26 is formed by the diffusion of phosphorous into the base region, the junction being roughly indicated by the line 27 between the two. Finally, the aluminum stripes 28 and 30 are evaporated upon the emitter and base regions, respectively, through an oxide mask 29 which may be composed of $SiO_2$. It is to these stripes that the thermocompression bonds are made with the coated lead wire, from which the bridging portion 34 is ultimately removed in the manner described above.

Although what has been described constitutes a preferred embodiment of the invention, various alternatives will suggest themselves to those skilled in the art upon a reading of the specification. Obviously, the gold-coated wire of the invention is generally applicable to all types of thermocompression bonding, especially where considerations of fragility or miniaturization are of importance. Similarly, the technique of selectively dissolving portions of leads is susceptible to utilization in fields other than those discussed. These and other alternatives are believed to fall within the purview of the present invention which should be limited only by the spirit and scope of the appended claims.

What is claimed is:

1. In a semiconductor device having at least one operative element, the combination comprising: a layer of metal evaporated on the element; and a lead wire thermo-compressively bonded to said layer; said lead wire consisting of a center core of a metal selected from the group consisting of molybdenum, tungsten, nickel, steel, and alloys thereof, adherently coated with a surface layer of a metal selected from the group consisting of gold, silver, platinum, aluminum and malleable alloys thereof.

2. In a semiconductor device having an operative element provided with a surface layer of aluminum, a lead wire thermo-compressively bonded to the aluminum layer, said lead wire consisting of a central core of molybdenum adherently coated with a surface layer of gold.

3. In a semiconductor device having at least one operative element, the combination comprising: a layer of aluminum disposed on the element; and a lead wire thermo-compressively bonded to said layer; said lead wire consisting of a center core of a metal selected from the group consisting of molybdenum, tungsten, nickel, steel, and alloys thereof, adherently coated with a surface layer of a metal selected from the group consisting of gold, silver, platinum, aluminum and malleable alloys thereof.

References Cited by the Examiner

UNITED STATES PATENTS

| | | | |
|---|---|---|---|
| 2,820,932 | 1/58 | Looney | 317—235 |
| 2,887,628 | 5/59 | Zierdt | 317—234 |
| 2,963,632 | 12/60 | Kilian | 317—234 |
| 3,006,067 | 10/61 | Anderson et al. | 29—470 |
| 3,028,663 | 4/62 | Iwersen et al. | 29—473.1 |
| 3,054,174 | 9/62 | Rose et al. | 29—470 |

DARRELL L. CLAY, *Primary Examiner.*

BENNETT G. MILLER, DAVID J. GALVIN, *Examiners.*